United States Patent [19]

Bhargava

[11] Patent Number: 5,422,489
[45] Date of Patent: Jun. 6, 1995

[54] LIGHT EMITTING DEVICE

[76] Inventor: Rameshwar N. Bhargava, 5 Morningside Ct., Ossining, N.Y. 10562

[21] Appl. No.: 185,191

[22] Filed: Jan. 24, 1994

[51] Int. Cl.6 .............................................. G01J 1/58
[52] U.S. Cl. ................... 250/488.1; 250/486.1; 250/487.1
[58] Field of Search ............ 250/372, 372 EM, 486.1, 250/487.1, 488.1; 362/84

[56] References Cited

U.S. PATENT DOCUMENTS 3,525,864  8/1970  Leach ........................... 250/488.1 X
4,647,399  3/1987  Peters et al. .................. 252/301.4 P
4,772,417  9/1988  Pappalardo et al. ......... 252/301.4 P
4,931,312  6/1990  De Leeuw et al. ................... 427/64

FOREIGN PATENT DOCUMENTS 8403099  8/1984  WIPO ................................. 362/84

Primary Examiner—Constantine Hannaher
Assistant Examiner—Edward J. Glick

[57] ABSTRACT

A glowing device comprises a substrate which is substantially transparent to radiation in a first spectral region and supports a nanoparticle or nanocrystal active layer, which is a thin layer constituted of separated tiny particles with nanometer dimensions, typically 100 Å or less in size. When the nanocrystal layer comprises one of certain luminescent materials activated with certain activators, the layer when excited will efficiently emit radiation characteristic of the activator. Since the particles making up the active layer are very small, the layer can be made very thin, of the order of 1000 Å or less. With this small thickness, the layer will be substantially transparent to radiation except for a narrow range of radiation capable of being absorbed by the active layer and thus capable of exciting the nanocrystal layer. When thus excited, the active layer will emit radiation in a narrow wavelength range. When the incident radiation extends over a broad spectral region, then part of the spectral energy will be absorbed and converted to the radiation characteristic of the nanocrystal layer, and the rest will pass through the nanocrystal layer and substantially transparent substrate, which to an observer will appear to glow with light in the narrow wavelength range. By providing multiple layers of nanocrystals, each responsive to a different part of the spectrum, a larger part of the incident radiation energy will be converted to glowing light.

24 Claims, 3 Drawing Sheets

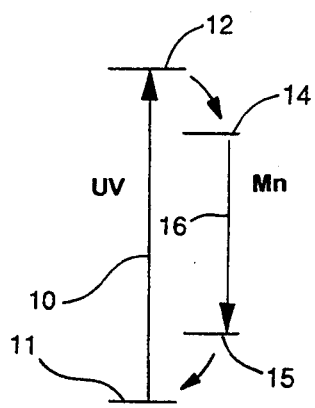
Fig. 1A
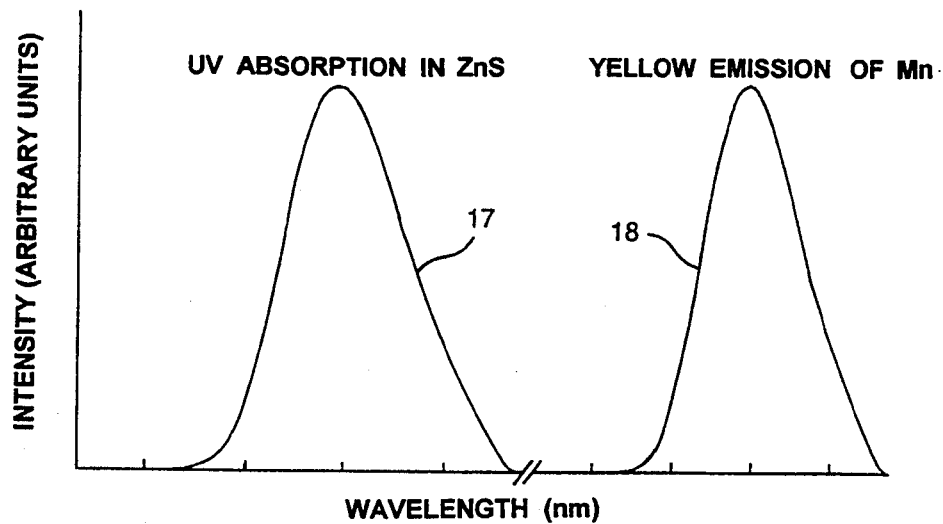
Fig. 1B
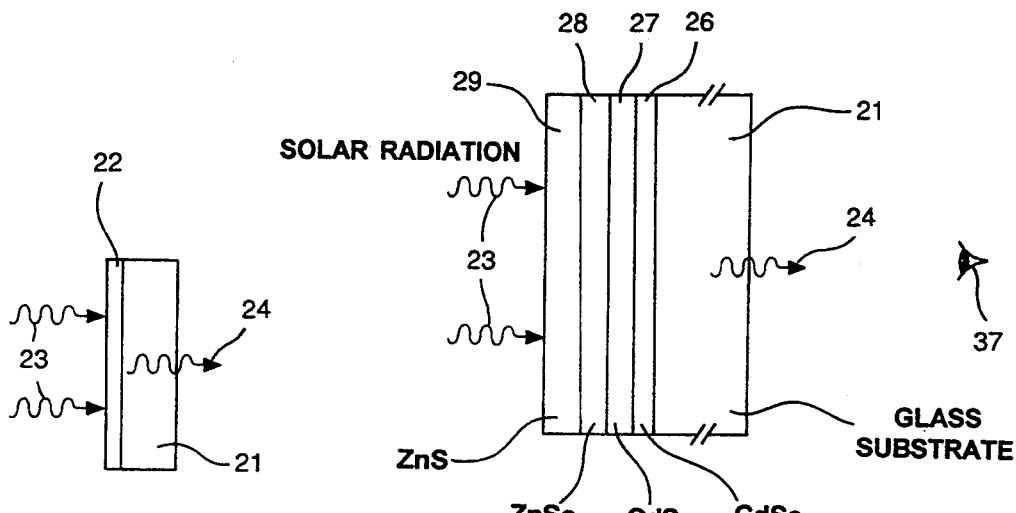
Fig. 2
Fig. 3

LIGHT EMITTING DEVICE

This invention relates to a radiation-responsive light emitting device, and in particular to a device which efficiently converts a relatively wide range of wavelengths of incident radiation to radiation over a narrower range of wavelengths.

BACKGROUND OF THE INVENTION

Devices which respond to shorter wavelength incident radiation to emit radiation of a longer wavelength are known. Any device provided with a fluorescent layer will in response to exciting radiation in a certain wavelength range emit radiation in a longer wavelength range characteristic of the fluorescent material. When the exciting radiation, however, extends over a wide spectral region, then only a very narrow range of wavelengths above its absorption edge are capable of exciting the fluorescent material, and the rest of the exciting spectrum is effectively wasted. Thus, only a small part of the energy associated with the incident radiation is used. Where, for example, the desire is to excite the fluorescent material with solar radiation, then most of the solar energy is wasted and only a relatively small part is converted to the characteristic radiation of the fluorescent material.

SUMMARY OF THE INVENTION

An object of the invention is a device which in response to incident radiation efficiently converts the energy in the incident radiation into a desired spectral region.

Another object of the invention is a device which will emit radiation in a narrow spectral region in response to incident radiation in a wider spectral region and that will utilize a much larger part of the energy of the incident radiation than existing devices.

In accordance with one aspect of the present invention, the device comprises a substrate which is substantially transparent to radiation in a first spectral region and supports a nanoparticle or nanocrystal active layer. By "nanoparticle" or "nanocrystal" layer is meant a thin layer constituted of separated tiny particles with nanometer dimensions, typically 100 Å or less in size. When the nanocrystal layer comprises one of certain luminescent materials activated with certain activators, the layer when excited will efficiently emit radiation characteristic of the activator. Since the particles making up the active layer are very small, the layer can be made very thin, of the order of 1000 Å or less. With this small thickness, the layer will be substantially transparent to radiation except for a narrow range of radiation capable of being absorbed by the active layer and thus capable of exciting the nanocrystal layer. When thus excited, the active layer will emit radiation in a narrow wavelength range that is always longer (of smaller energy) than that of the exciting radiation. When the incident radiation extends over a broad spectral region, then part of the spectral energy will be absorbed and converted to the radiation characteristic of the nanocrystal layer, and the rest will pass through the nanocrystal layer and substantially transparent substrate.

In accordance with another aspect of the invention, the amount of energy concentrated in the desired spectral emission range of the nanocrystal layer can be enhanced by providing a filter for transforming the passed radiation into the desired spectral region. With this embodiment, the output will comprise the emission spectrum of the nanocrystal layer and that part of the incident radiation passed by the filter. In a preferred embodiment, the filter is incorporated in the substrate. So, when, for example, the desired output radiation is yellow in color, the substrate would be colored yellow.

In accordance with still another preferred aspect of the invention, the amount of energy concentrated in the desired spectral emission range of the nanocrystal layer can be enhanced by providing a second and a third or more additional nanocrystal layers capable of absorbing different spectral parts of the incident radiation for transforming such radiation into desired output radiation by way of the luminescent properties of the additional layers.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

FIG. 1A is a bandgap diagram showing excitation of doped nanocrystals for use in one form of a device of the invention;

FIG. 1B shows the absorption and emission spectrums of one form of doped nanocrystals for use in one form of a device of the invention;

FIG. 2 is a schematic diagram illustrating one form of a device of the invention;

FIG. 3 is a schematic diagram illustrating another form of a device of the invention;

DETAILED DESCRIPTION OF THE PREFERRED EMBODIMENT

Figure 4:
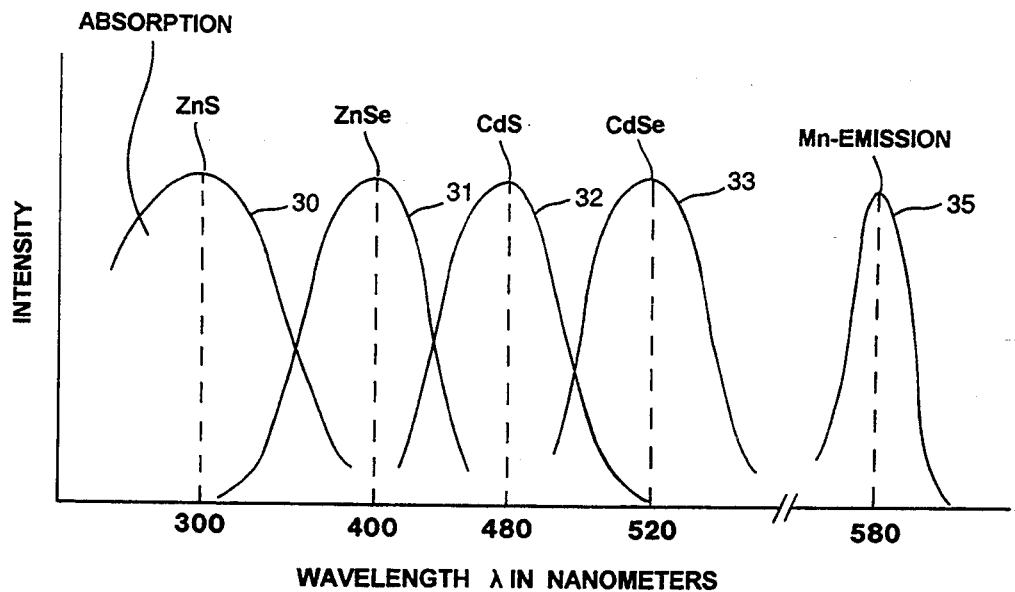
FIG. 4 shows the absorption and emission spectrums of doped nanocrystals for use in the device of FIG. 3.

A preferred embodiment of the present invention comprises a light-emitting device comprising a substrate, for example of glass or acrylic plastic, referred to herein from time to time as "glowing glass" obtained by coating a given colored or filtered substrate with a nanocrystal layer that emits the same colored light under excitation by wavelengths of higher energy. Such coated thin films will efficiently convert a good fraction of the energy distributed in the spectral region higher than the emitted line (the "color" referred to) by absorption and efficient down-energy conversion to a single or narrow-band emission spectral region.

For example, with multiple active layers of different host luminescent materials but with the same activator dopant, the solar radiation from ultraviolet (UV) to green could be absorbed efficiently in this glowing glass and be converted to yellow color, when each nanocrystal layer emits yellow and the substrate is yellow colored. The result is to concentrate the incident spectral radiation from a broad wavelength source, such as solar energy or high pressure lamps, into a single color.

The above is achieved through the use of doped nanocrystalline materials. In, for example, the following papers, it has been shown that certain doped nanocrystalline materials, when exposed to UV light, will efficiently convert the UV light into yellow light:

Bhargava et al., "Optical Properties of Manganese-Doped Nanocrystals of ZnS", Phys. Rev. Letters, 72(3), 416–419, January 1994.

Bhargava et al., "Doped Nanocrystals of Semiconductors-A New Class of Luminescent Materials", Journal of Luminescence, 60 & 61, 275–280 January 1994.

For further background on such doped nanocrystalline materials and their preparation, reference is also had to:

Wang et al., "Nanometer-sized Semiconductor Clusters: Materials Synthesis, Quantum Sized Effects, and Photophysical Properties", J. Phys. Chem, 1991, 95, 525–532; Alivisatos et al., "Electronic States Of Semiconductor Clusters . . .", J. Chem. Phys., 89, No. 7, 4002–4011; Steigerwald et al., "Synthesis, Stabilization And Electronic Structure of Quantum Semiconductor Monocrystals", Annual Rev. Mater. Sci., 1898 19:471–495.

FIGS. 1A and 1B illustrates the down-conversion described above. In this example, the nanocrystals were ZnS doped with Mn ions as the activator. FIG. 1A is a schematic of an energy band diagram, with 10 indicating the short wavelength UV transition upon excitation from some ground state 11 to an arbitrary higher energy level 12. Within a short lifetime, the state will decay with a non-radiative transition to an intermediate level 14, and then with a longer wavelength radiative transition 16 characteristic of the Mn activator to a lower energy state 15 and from there back to the ground state. FIG. 1B shows an energy graph vs. wavelength with wavelength increasing to the right, with the curve 17 at the left indicating the absorption curve for UV in ZnS, and the curve 18 on the right showing the yellow emission spectrum of the Mn activator. Similar curves would result for Mn-activated ZnS in bulk form, but the advantages of the nanocrystals are:

(1) Doped nanocrystalline materials under 100 Å in size, preferably in the range of 15-75 Å, absorb energy above the bandgap and transfer this energy very efficiently to an activator ion such as Mn in ZnS.

(2) Because the nanocrystals are so small, thin films of such materials, preferably in the range of 50–1000 Å, are easily formed. Such thin films are transparent and little scattering would occur when coated over glass or plastic with an appropriate known index matching polymer or matrix. Since the absorption of the incident radiation is high, the films can be made completely transparent away from the bandgap energy.

(3) Multiple layers of these doped nanocrystalline materials with different hosts can in a combined fashion absorb all the incident radiation above a certain energy, and down convert to the same light characteristic of and emitted by the activator present.

FIG. 2 illustrates one form of light-emitting device in accordance with the invention comprising one layer of nanocrystals. A yellow-colored glass substrate 21 supports a single layer of Mn-doped ZnS 22. If desired, to reduce scattering, a known anti-scattering layer (not shown) whose index of refraction substantially matches that of the glass can be provided on the receiving surface of the layer 22. With solar radiation 23 incident on the coated side of the substrate, the radiation in the spectral region of 250-350 nanometers becomes absorbed in the ZnS and excites the Mn activator to emit radiation in the range of 560-600 nm. The remaining radiation, except for the yellow part, is substantially absorbed by the filtering action of the yellow glass. Hence, the output 24 combines emitted radiation characteristic of the Mn activator in the yellow spectral region, and that portion of the yellow spectral region from the incident solar radiation which is too long in wavelength to be absorbed by the doped nanocrystalline materials.

FIG. 3 shows another form of the invention which exhibits the third advantage listed above. The same reference numerals are used for similar elements in this and the other embodiments. A glass substrate 21, which may again be colored yellow, supports, in succession, a first light-emitting nanocrystal layer 26, for example of CdSe activated by Mn, a second light-emitting nanocrystal layer 27, for example of CdS activated by Mn, a third light-emitting nanocrystal layer 28, for example of ZnSe activated by Mn, and a fourth light-emitting nanocrystal layer 29, for example of ZnS activated by Mn. Solar radiation 23 is seen incident on the coated side of the substrate, and on the output side at the right will be generated substantially only yellow light 24.

This is achieved as indicated in the spectral graph shown in FIG. 4, which shows the absorption spectra of ZnS 30, ZnSe 31, CdS 33, CdSe 34, and the emission spectra 35 characteristic of the excited Mn activator present in all the doped nanocrystalline material layers 26–29 as a function of wavelength, $\lambda$. As will be noted, each host has an absorption characteristic that falls off rapidly at wavelengths approximately 40 nm above its peak, which means that the layer is substantially transparent to radiation at that wavelength and higher wavelengths, which thus pass on to the succeeding layer. Thus, the radiation wavelengths in the solar radiation in the spectral range of 250–350 nm is absorbed by the outer layer of ZnS 29, and the longer wavelength remainder passes through to the next layer 28; the radiation wavelengths in the solar radiation in the spectral range of 350–440 nm is absorbed by the next layer 28 of ZnSe, and the longer wavelength remainder passes through to the next layer 27 of CdS; the radiation wavelengths in the solar radiation in the spectral range of 440–520 nm is absorbed by the layer 27 of CdS, and the longer wavelength remainder passes through to the next layer 26 of CdSe; the radiation wavelengths in the solar radiation in the spectral range of 500–540 nm is absorbed by the inner layer 26 of CdSe, and the remainder passes through to the substrate 21, which absorbs all but the yellow portion. Each of the nanocrystal layers 26–29 when excited emitted yellow light, to which all the layers are transparent. The result is that a substantial portion of the solar spectrum in the range of 250–540 nm has been down converted to yellow light, and the yellow part of the solar spectrum has passed directly through the active layers transparent to the yellow light so that an observer 37 on the downstream side of the structure in FIG. 3, i.e., on the substrate side, will see what appears to be transparent glass that is glowing yellow.

Figure 5:
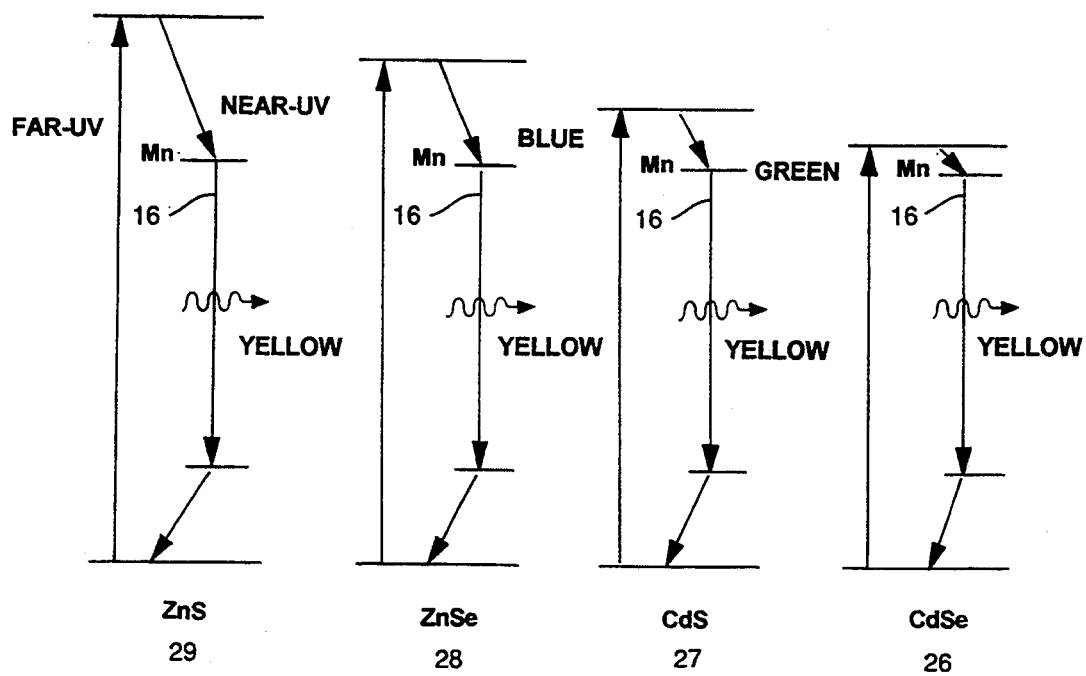
FIG. 5 shows the bandgap diagrams of doped nanocrystals for use in the device of FIG. 3.

FIG. 5 shows the corresponding bandgap diagrams for the structure of FIG. 4, labelled with the spectral portion (Far UV, Near UV) or color (Blue, Green) of the absorption transition for each of the active layers 26–29, and showing the same Mn transition for emitting the yellow light.

Figure 6:
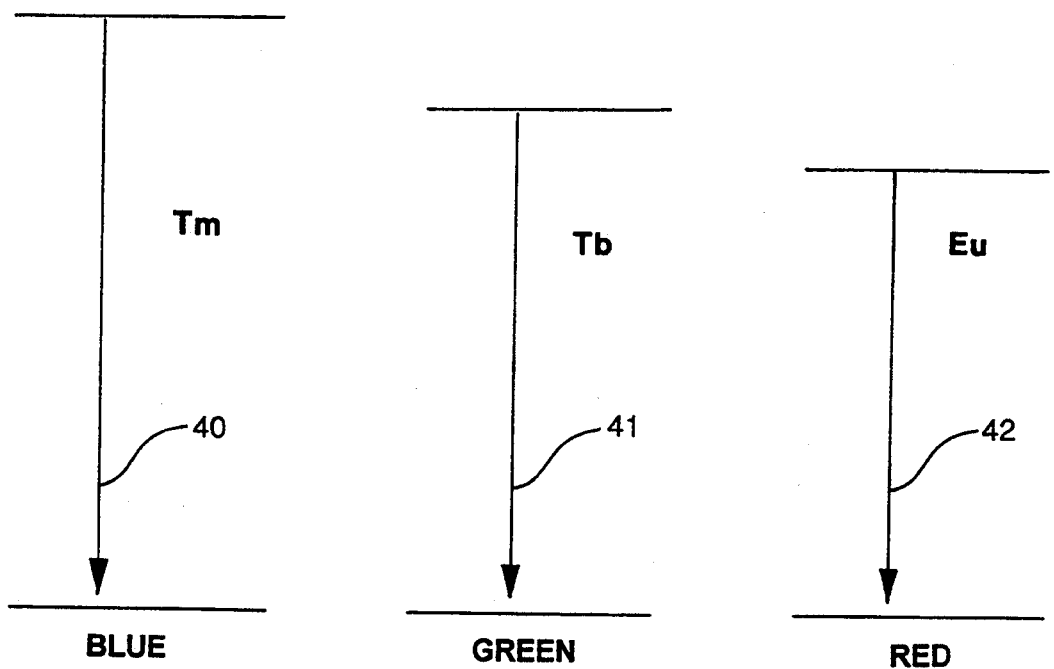
FIG. 6 shows the bandgap diagrams of nanocrystals for use in another form of device similar to that of of FIG. 3.

The invention is not limited to a device that glows in yellow light when exposed to radiation in a broad spectral region. By changing the activator in the same or different hosts, radiative transitions in other colors are possible. For example, using as the activator the rare earth elements will allow emissions in the blue, green, or red regions of the spectrum. FIG. 6 illustrates schematically the radiative transition for Tm on the left, which emits blue light, for Tb in the center, which emits green light, and for Eu on the right, which emits red light. The host materials described above, activated with one of these activators and in the same nanocrystal form, will efficiently emit the colored light indicated.

Further, while a substrate with a built-in or associated filter for absorbing light outside of the desired spectral region output will produce the best effect, the invention is not limited to colored substrates and a transparent substrate can be used in its place.

Figure 7:
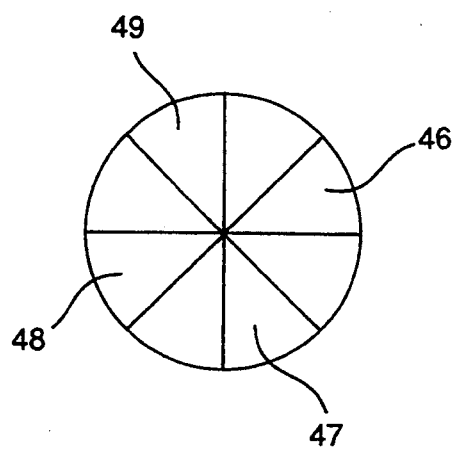
FIG. 7 is a plan view of another device according to the invention.

FIG. 7 shows, as another structure, a segmented light-emitting structure 46 in which some 47, 48, 49 or all of eight segments are constructed of glowing glass of the type described in connection with the embodiments of FIGS. 2 and 3. Each segment in response to incident radiation can be caused to glow in a different color by applying the appropriate active layer to a transparent substrate.

Other applications of the inventive glowing device include: industrial applications wherever colored glass is used, including toys, and clocks. To enhance the effect, a black light (UV) can be included in the structure to enhance the glow. Stained glass windows and lamp shades are other examples of applications of glowing glass. A good application is for window glass, which would change color under incident solar radiation. Other important uses include its application to display advertisements exposed to solar radiation or black light, in which text or graphics can be formed by active layers of doped nanocrystals on a substrate, with the result that the text or graphics can be made to glow and thus made more prominent.

The active layers of doped nanocrystals can be fabricated as described in the publications referenced above. A preferred method for Mn doped ZnS is based on organometallic chemistry in a hydrocarbon solvent, which is used to precipitate nanocrystalline ZnS. This material is preferably doped during precipitation by a room temperature chemical process, since the nanocrystals must remain separated and of small size and high-temperature processing may tend to cause nanocrystal growth or clustering. To chemically dope the ZnS, manganese chloride is reacted with ethylmagnesium chloride (Grignard reaction) to form diethylmanganese in a tetrahydrofuran solvent. Since the diethylmanganese is unstable, it must be used immediately in the ZnS synthesis reaction. The quantum confinement of the precipitated particles is maintained by coating with a surfactant (methacrylic acid) which provides a barrier to particle contact. The other luminescent materials described above can be made by similar techniques. The invention is not limited to doped nanocrystals made by the preferred method described above, and it will be clear to those skilled in this art how to use the processes described in the publications referenced above to fabricate the desired nanocrystals. A layer is readily provided by suspending the thus-fabricated doped nanocrystal powder in a suitable binder, for example, any organic binder, such as ethanol, and brushing or silk screening or applying in another known technique to form the desired thin active layer on a suitable substrate.

In certain applications, instead of multiple discrete thin layers of different host active materials as described in connection with FIG. 3, it is possible to make up a single thicker layer containing a mixture of a plurality of doped nanoparticle hosts, usually with the same activator, to utilize a larger fraction of the incident radiation spectrum. For example, the single layer can contain a mixture of Mn-doped ZnS nanoparticles and Mn-doped ZnSe nanoparticles, which would thus respond to incident radiation in the range of 250–450 nm to produce more efficient yellow light.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A glowing device comprising:
   (a) a substrate substantially transparent in a first spectral region and substantially absorbent in a second spectral region,
   (b) a thin active layer on said substrate, said active layer comprising separate nanoparticles capable of emitting radiation in said first spectral region in response to incident radiation in a third spectral region, said active layer having a thickness less than about 1000 Angstroms,
   (c) said device being positioned such that the active layer faces in the direction of and can receive incident radiation in said third spectral region.

2. The glowing device as claimed in claim 1, wherein the third spectral region has a wider wavelength range than the first spectral region.

3. The glowing device as claimed in claim 1, wherein the nanoparticles each comprise a host compound doped with an activator, said host compound having a bandgap capable of absorbing radiation in said third spectral region, said activator forming in the host bandgap energy levels providing radiating transitions in the first spectral region.

4. The glowing device as claimed in claim 1, wherein said active layer is less than 500 Å thin.

5. The glowing device as claimed in claim 1, wherein said substrate and active layer are substantially transparent to visible light in the first spectral region.

6. The glowing device as claimed in claim 1, wherein the nanoparticles each comprise a mixture of a first and a second host compound doped with an activator, said first host compound having a bandgap capable of absorbing radiation in a first part of said third spectral region, said second host compound having a bandgap capable of absorbing radiation in a second part of said third spectral region, said activator forming in the first and second host compound bandgaps energy levels providing radiating transitions in the first spectral region.

7. A glowing device comprising:
   (a) a substrate substantially transparent in a first spectral region,
   (b) a filter associated with said substrate and substantially transparent in said first spectral region and substantially absorbent in a second spectral region,
   (c) a thin active layer on said substrate, said active layer comprising separate nanoparticles capable of emitting radiation in said first spectral region in response to incident radiation in a third spectral region, said nanoparticles having a thickness less than abut 100 Angstroms, (d) said device being positioned such that the active layer faces in the direction of and can receive incident radiation in said third spectral region.

8. The glowing device as claimed in claim 7, wherein the third spectral region has a wider wavelength range than the first spectral region.

9. The glowing device as claimed in claim 7, wherein the nanoparticles each comprise a host compound doped with an activator, said host compound having a bandgap capable of absorbing radiation in said third spectral region, said activator forming in the host bandgap energy levels providing radiating transitions in the first spectral region.

10. The glowing device as claimed in claim 9, wherein said nanoparticles are less than 100 Å in size.

11. The glowing device as claimed in claim 9, wherein said substrate and active layer are substantially transparent to visible light in the first spectral region.

12. The glowing device as claimed in claim 7, wherein said third spectral region is substantially the same as that of solar radiation, and the first spectral region is a narrow band of wavelengths within the solar energy spectrum.

13. The glowing device as claimed in claim 12, wherein the activator is Mn and the first spectral region is yellow.

14. A glowing device comprising:
(a) a substrate substantially transparent in a first spectral region,
(b) a filter associated with said substrate and substantially transparent in said first spectral region and substantially absorbent in a second spectral region,
(c) a first thin active layer on said substrate, said first active layer comprising separate nanoparticles capable of emitting radiation in said first spectral region in response to incident radiation in a third spectral region,
(d) a second thin active layer on said first active layer, said second active layer comprising separate nanoparticles capable of emitting radiation in said first spectral region in response to incident radiation in a fourth spectral region that encompasses shorter wavelengths than the third spectral region,
(e) said device being positioned such that the second active layer faces in the direction of and can receive incident radiation in said third and fourth spectral regions.

15. The glowing device as claimed in claim 14, wherein the nanoparticles each comprise a host compound doped with an activator, said host compound in said first active layer having a bandgap capable of absorbing radiation in said third spectral region, said host compound in said second active layer having a bandgap capable of absorbing radiation in said fourth spectral region, said activator forming in the bandgap of the host compound in said first and second active layers energy levels providing radiating transitions in the first spectral region.

16. The glowing device as claimed in claim 15, wherein the host compound is different in said first and second active layers, but the activator is the same.

17. The glowing device as claimed in claim 16, wherein said substrate and active layers are substantially transparent to visible light in the first spectral region.

18. The glowing device as claimed in claim 17, wherein said host compound in said first active layer is ZnS, said host compound in said second active layer is ZnSe, and the activator is Mn.

19. The glowing device as claimed in claim 17, further comprising a third thin active layer on said second active layer, said third active layer comprising separate nanoparticles capable of emitting radiation in said first spectral region in response to incident radiation in a fifth spectral region that encompasses shorter wavelengths than the fourth spectral region.

20. The glowing device as claimed in claim 19, further comprising a fourth thin active layer on said third active layer, said fourth active layer comprising separate nanoparticles capable of emitting radiation in said first spectral region in response to incident radiation in a sixth spectral region that encompasses shorter wavelengths than the fifth spectral region.

21. The glowing device as claimed in claim 20, wherein the third and fourth active layers have different host compounds from that of the first and second active layers but the same activator.

22. The glowing device as claimed in claim 21, wherein the first, second, third and fourth active layers comprise, respectively, CdSe, CdS, ZnSe, and ZnS.

23. The glowing device of claim 22, wherein the activator is Mn.

24. A glowing device comprising:
a) a substrate substantially transparent in a first visible spectral region and substantially absorbent in a second visible spectral region,
b) a thin active layer on said substrate, said active layer comprising separate nanoparticles capable of emitting radiation in said first spectral region in response to absorption of incident radiation in a third spectral region, said active layer being substantially transparent to all visible radiation longer in wavelength than that of the third spectral region, said nanoparticles having a size less than about 100 Angstroms,
c) said device being positioned such that the active layer faces in the direction of and can receive incident radiation in said third spectral region.

* * * * *